Dec. 15, 1936.  B. B. WHITTAM  2,063,967
COMPRESSION JOINT
Filed March 22, 1935
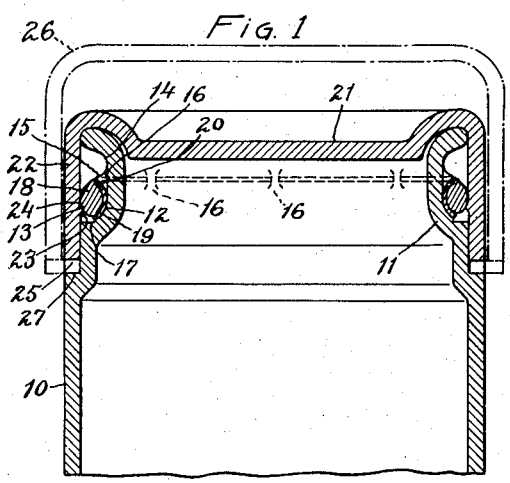
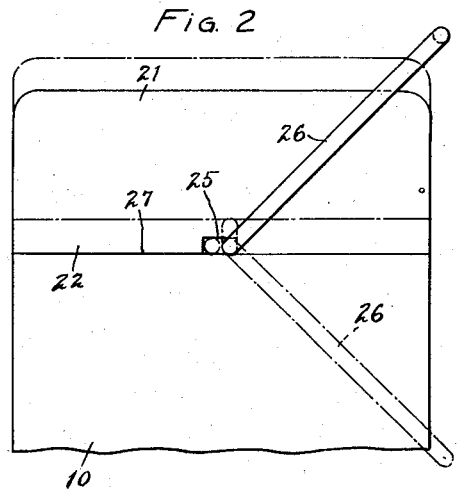
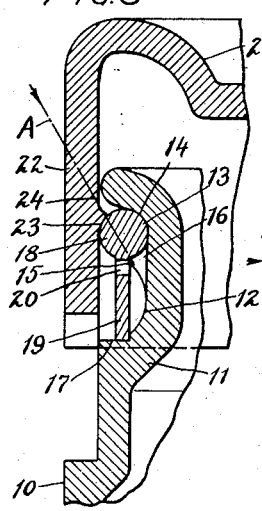
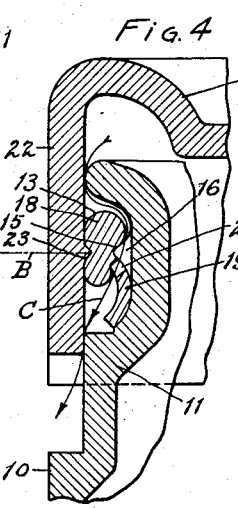
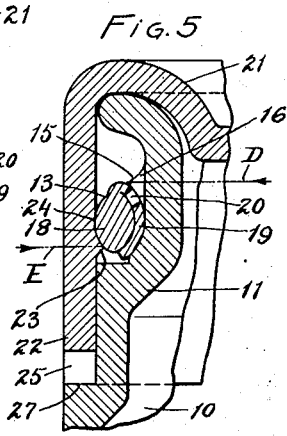
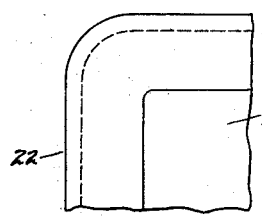
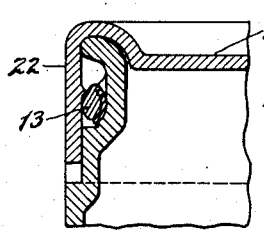
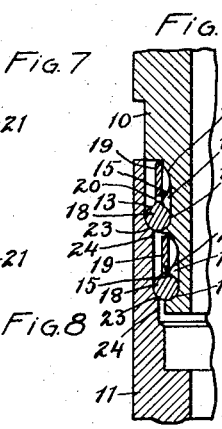
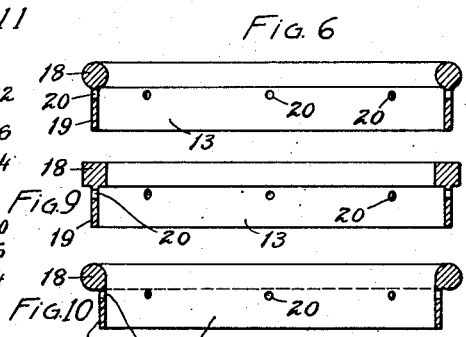
INVENTOR
B. B. Whittam,
BY Robert M. Pierson,
ATTORNEY Patented Dec. 15, 1936

2,063,967

UNITED STATES PATENT OFFICE 2,063,967

COMPRESSION JOINT

Benjamin B. Whittam, Akron, Ohio

Application March 22, 1935, Serial No. 12,444

18 Claims. (Cl. 215—40)

This invention relates to compression joints employing a distortable rubber ring between a pair of telescoping members to be assembled or disconnected by relative axial movement, to provide a sealed container closure, a pipe coupling, an oscillating joint for spring shackles, etc., a resilient engine mounting or the like, and to serve other purposes for which it may be adapted.

Among the general objects of the invention are to provide an inexpensive and durable joint not requiring vulcanization of the rubber member or members to adjacent surfaces and permitting the parts to be quickly assembled and disconnected, and among the particular objects applying to a container closure are the foregoing, as well as the provision of a seal which is self-venting during assembly, avoidance of the use of a special closing device and holding of the gasket ring in place when the cover is removed.

Of the accompanying drawing, Fig. 1 is a vertical sectional view showing a jar closure embodying my invention.

Fig. 2 is a side elevation showing the use of an opening tool.

Figs. 3, 4 and 5 are detail vertical sectional views showing successive positions of the closure member in the act of assembly.

Fig. 6 is a vertical sectional view of the gasket ring.

Fig. 7 is a plan view of a container of modified shape provided with the improved joint.

Fig. 8 is a vertical detail sectional view of the latter.

Figs. 9 and 10 are views corresponding to Fig. 6, showing modified gasket rings.

Fig. 11 is a detail vertical section showing a modified joint, including a plurality of rubber rings.

Referring at first to Figs. 1 to 6 illustrating the jar-closure embodiment of my invention with a preferred form of gasket ring, 10 is a jar body having a mouth wall or neck 11 of slightly reduced diameter, constituting the inner one of the two telescoping joint members, said neck is externally formed with an annular, grooved permanent seat 12 for the packing ring or gasket 13, a parallel, annular temporary seat 14 of the same diameter as the seat 12, for the upper margin of the ring 13, and an intervening annular rib 15 which is formed with shallow, vertical venting notches 16 at regular intervals throughout its circumference. The jar neck is also formed immediately below the gasket seat 12 with a ledge or shoulder 17 forming a stop for the gasket in the latter's extended position.

The gasket ring 13 is made of a vulcanized soft composition of rubber or any suitable equivalent thereof, its upper margin is preferably formed as a bead 18 of substantially circular section and the remainder of the ring for most of its depth is a thinner, parallel-sided skirt 19 transversely perforated in the vicinity of the bead with a series of venting apertures 20 of the same number and spacing as the rib notches 16 and adapted to be circumferentially registered with the latter when the gasket ring is located around the neck of the jar. The bead 18 constitutes a core portion of the gasket ring, on which the skirt portion 19 may be wrapped as hereinafter described, and its form may be varied. The skirt portion 19 surrounds the seat 12 in both the wrapped and the unwrapped condition.

21 is the cap, closure or cover for the jar 10, the same having a dependent cylindrical flange 22, which constitutes the outer telescoping joint member, internally formed with an annular shoulder 23 to coact with the neck rib 15 in rolling the gasket, and having an adjacent annular compressing surface 24 above said shoulder. The lower rim of the cover flange is formed with a pair of opposite notches 25 to receive the ends of a bail lever 26 for prying open the cover as represented in Fig. 2, said lever having at its ends a pair of short offset arms, and fulcrum points where they join the longer arms, to rest on a shoulder 27 of the jar while the short arms pry against the tops of the notches. The prying action is exerted by swinging the bail downwardly from its full-line to its broken-line position. The cover may also sometimes be removed by hand without the assistance of a tool.

In the operation of this device, the gasket 13 is placed under some tension around the jar neck 11, with its lower edge adjacent the stop shoulder 17 and its bead 18 above the rib 15, as shown in Fig. 3. The cover 21 is then assembled with the other parts in the preparatory closing position represented in said view for the exertion of downward axial pressure, at which time the resultant pressure on the gasket bead is approximately in the direction of the diagonal line A, falling below a parallel diameter of the bead. Downward movement of the cover rolls the gasket, beginning with its bead 18, first to the intermediate position represented in Fig. 4 where the shoulder 23 is opposite the rib 15 and the resultant gasket compression in the direction of line B, causing considerable distortion of the bead, leaving most of its volume back of or above the shoulder 23, causing the gasket skirt 19 to curve inwardly against the bottom of the seat 12 and lifting the inner side of the upper margin of the gasket away from the temporary seat 14 so as to uncover the upper ends of the notches 16 to permit venting, through said notches, the gasket apertures 20 and past the sliding lower surfaces of the cover and jar neck, of the air which is compressed above the gasket by the downward movement of the cover, the course of the air venting being represented by the arrow line C in Fig. 4.

A continuation of the downward cover movement to the closed position, for a total movement which is twice that of the gasket bead, completes the rolling of the gasket around a ring axis which is approximately that of the bead 18, causes the skirt 19, which abuts the neck seat 12, to be wrapped or folded about half way around the bead 18 and thereby closes the vent apertures 20 so that further venting cannot occur either outwardly or inwardly. Since the width of the space between the seat 12 and the compressing face 24 in the final position illustrated in Fig. 5 is less than the normal thickness of the bead 18 plus that of the skirt 19, the gasket in the closed position is under considerable lateral compression and vertical distortion, and the result is an airtight sealing of the jar. The pressures of the rib 15 and shoulder 23 are then exerted in the direction of the parallel spaced lines D and E. Where the jar contents are preheated in packing, there may be the usual augmentation of closing pressure by the vacuum resulting from steam condensation when the contents are cooled, and in that case the back pressure of the atmosphere on the lower side of the gasket, tending to widen the latter, augments the sealing effect.

The use of a gasket of the described form, having a relatively great depth or vertical width, tends to prevent local tipping of the moving parts during closure, such as is experienced with a shallow gasket ring of regular circular or other section, and thus permits the closure to be manually effected with ease, without the use of a special closing appliance. A sealed closure whose parts are assembled and disconnected by relative axial movement as described is much more rapidly and easily effected, especially in opening the sealed jar after long standing, than the usual screw or lever-operated joints, and the sealing is more secure, thereby avoiding liability to spoilage of the contents. On opening the jar, the skirt of the unrolling gasket tends to cling to the jar neck and thus avoids jumping off of said element, such as would be often experienced with a shallow gasket of the rolling type.

Figs. 7 and 8 illustrate a modification in which the jar neck 11 and the cover 21 with its flange 22 in plan form are of a rectangular shape such as square, to which the gasket 13 will readily conform, and which could not be used with a screw top. The square-body jar is sometimes preferred for space saving on shelves and in packing cases, and when the top conforms to this shape, the mouth area for filling and discharge of contents is increased, and wide internal corner overhangs which make a jar harder to clean are avoided.

The gasket 13 may take modified forms, as in Fig. 9 where a marginal bead 18 of approximately square section is shown, or as in Fig. 10 which illustrates a generally circular bead with the skirt 19 extending from the inner side thereof in a tangent direction.

My invention may be used with a plurality of gaskets or compressible connecting members of any of the described forms, associated with each other and with the members to be connected, in tandem or in concentric arrangement, and it may also be embodied for use as a device other than a container closure, such as a pipe coupling, an oscillating connection for spring shackles and other joints, a resilient mounting for motors and other machines subject to vibration, etc. Fig. 11 shows a comprehensive modification illustrating the use of a pair of compression rings applicable to a jar closure as well as the other devices mentioned and also intended to represent any of these other devices. 10 is the inner male member which, for most uses, including pipe couplings and oscillating joints, would be of circular section and 11 is the concentric outer member, sleeve or tube to be connected therewith by one or more rubber rings 13 of the type previously described, by pushing the members axially together from the preliminary assembly position shown in this view.

In this instance I have illustrated two of the rubber rings provided with venting apertures 20 for coaction with notched male-member ribs 15, as for a container where a double seal may be desired. Where venting is not required, it will be understood that the apertures and notches may be omitted. The number of rubber rings may also be more or less than two and are shown in positions inverted from the ring posture previously described. The rings and their seats are here of different diameters and the upper shoulder 23 outwardly offset from the lower one to permit assembly of the lower member 11 with the rings and simultaneous engagement of said shoulders with the ring beads 18. In closing this joint to place the rubber rings under compression, the members 10 and 11 are pushed axially together, the rings 13 are rolled and wrapped upon themselves in passing over the ribs 15 from the temporary seats 14 to the permanent seats 12, and the rings thereby distorted and held under compression by crowding of the increased thickness of rubber into the spaces between the seats 12 and the compression surfaces 24. The resulting frictional hold of the rubber on the adjacent surfaces of the members 10 and 11 is sufficient to permit a considerable relative torsional movement of said members without slipping on the rubber and also to yieldingly oppose relative axial and tilting movements without slip, thereby providing a yielding compression joint whose parts are easily assembled and disconnected and its members capable of limited universal movement.

It will be understood that my invention is capable of embodiment in still other forms without departing from the scope thereof as defined in the claims.

I claim:

1. In a compression joint, the combination of an inner telescoping joint member externally formed with a circumferential gasket seat, a wrappable rubber gasket ring of greater width than thickness formed with a skirt portion which surrounds said seat in both the wrapped and the unwrapped condition of the gasket, and a core portion rollable over said skirt portion, and an outer telescoping joint member internally formed with a circumferential abutment for engaging and rolling said core portion upon the skirt portion by relative axial movement of the joint members.

2. A compression joint according to claim 1 in which the ring is a relatively thin rubber band having a thickened rolling bead.

3. A compression joint according to claim 1 in which the ring is a relatively thin rubber band having a thickened rolling bead of substantially circular section.

4. A compression joint according to claim 1 in which the ring is of rubber having a rolling bead of substantially circular section, and a relatively thin, substantially cylindrical skirt tangently united with said bead.

5. A compression joint according to claim 1 in which the ring is a relatively thin rubber band having a thickened rolling bead of rectangular section.

6. In a compression joint, the combination of a pair of concentric joint members, one of which has an annular final ring seat and an adjacent ring-rolling rib and the other a ring-rolling abutment, and an interposed soft-rubber ring capable of wrapping on itself and adapted to be rolled by the abutment over said rib, wrapped and placed under compression against said final seat by relative axial movement of said members.

7. In a compression joint, the combination of a soft-rubber ring capable of wrapping on itself, an inner joint member having an annular final seat for the wrapped ring, an annular temporary seat for one margin of the ring and an intervening annular rib, and a surrounding outer joint member having an annular shoulder for rolling said margin of the ring over the rib and onto the final seat while wrapping the ring upon itself and compressing it between the members by relative axial movement of said members.

8. In a container closure, the combination of a distortable ring capable of wrapping on itself, a container body and a cover therefor connectible by said ring and having means for rolling, wrapping and compressing the ring by relative axial movement of the body and cover.

9. In a container closure, the combination of a container body and cover therefor, and an interposed skirted rubber gasket ring capable of folding on itself by relative axial movement of said members and perforated for venting the interior of the container during the closing movement.

10. In a container closure, the combination of a jar having a neck externally formed with an annular ring-rolling rib having a venting notch, a cover having coacting ring-rolling means operable by axial movement of the cover, and an interposed soft-rubber gasket ring, capable of wrapping on itself when rolled, and formed with a venting aperture registering with the rib notch and adapted to be closed by the wrapping action.

11. In a container closure, the combination of a jar having a neck externally formed with parallel annular temporary and final ring seats and an intervening ring-rolling rib provided with a circumferential series of spaced venting notches, a cover having a flange formed with coacting ring-rolling means, and a rollable gasket ring of an extended width covering said seats, having a marginal bead located over the temporary seat when the ring is extended and adapted to be rolled over said rib by the closing movement of the cover, said ring also having a skirt over the final seat, formed with venting apertures registering with the rib notches, and adapted to be wrapped about said bead by the rolling action.

12. A rollable rubber gasket ring formed with a rolling bead and with a connected skirt portion adapted to be wrapped about the bead by the rolling action.

13. A rollable rubber gasket ring capable of folding on itself and formed with one or more venting apertures which are closed by the folding.

14. A rollable rubber gasket ring formed with a marginal bead and with a connected thinner skirt portion for wrapping about said bead, the skirt having one or more venting apertures adapted to be closed by the enwrapped head.

15. In a compression joint, the combination of a pair of connectible members, and a series of interposed soft rubber rings concurrently rollable and compressible into connecting position by relative axial movement of said members and formed to be wrapped on themselves by the rolling action.

16. A compression joint comprising tandem wrappable rubber rings of greater width than thickness, a pair of members connectible thereby, one of said members having final ring seats and adjacent ring-rolling ribs of different diameters, and the other having ring-rolling shoulders of different diameters, adapted simultaneously to abut the rings when the parts are in their preliminary assembling position, the rings being transversely distorted and held under compression in the final position.

17. A compression joint according to claim 16 in which each of the rings is formed with a rolling bead and a connected thinner skirt portion adapted to be wrapped about said bead by the rolling action.

18. A compression joint comprising concentric inner and outer members of circular section having a tandem arrangement of pairs of opposed ring seats of different diameters, and a plurality of wrappable soft-rubber rings of greater width than thickness, formed with core portions adapted to be concurrently rolled over the ring seats of the inner member to wrap said rings under compression by relative axial movement of said members.

BENJAMIN B. WHITTAM.